Oct. 7, 1958 — H. BERGER — 2,855,523
LIGHT RESPONSIVE SYSTEM
Filed Jan. 21, 1954 — 3 Sheets-Sheet 1
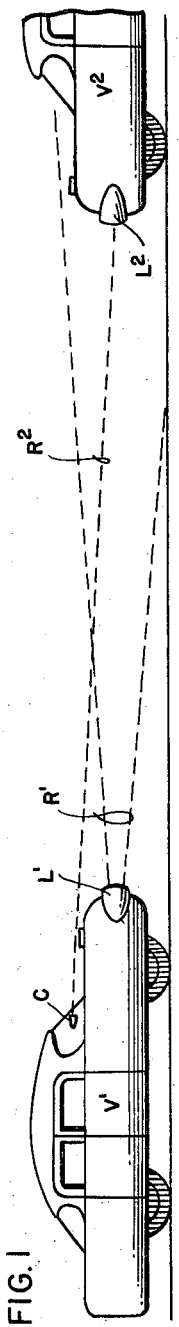
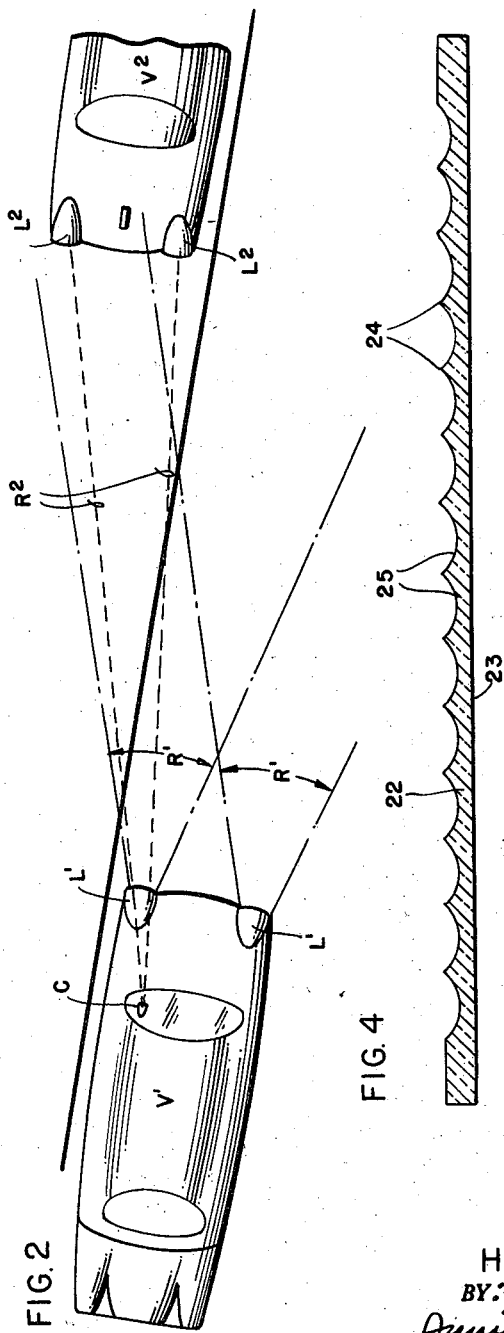
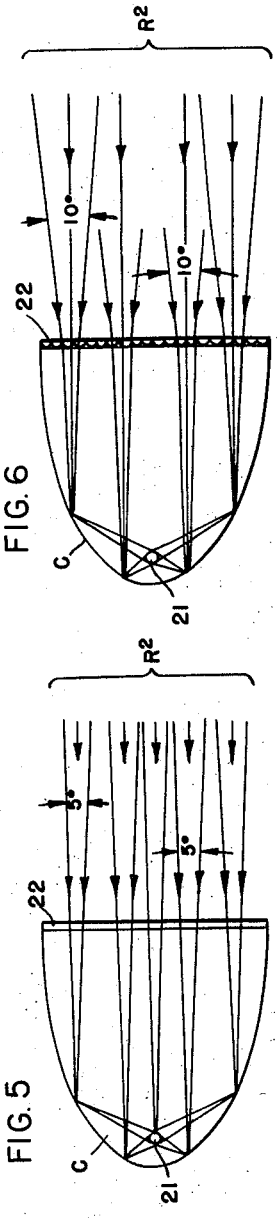
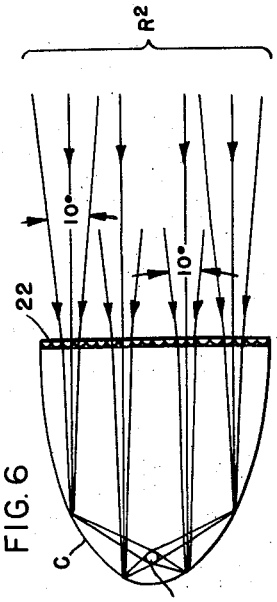
INVENTOR:—
HAROLD BERGER
BY:—
Junius F. Cook, Jr.
ATTORNEY Oct. 7, 1958  H. BERGER  2,855,523
LIGHT RESPONSIVE SYSTEM
Filed Jan. 21, 1954  3 Sheets-Sheet 2
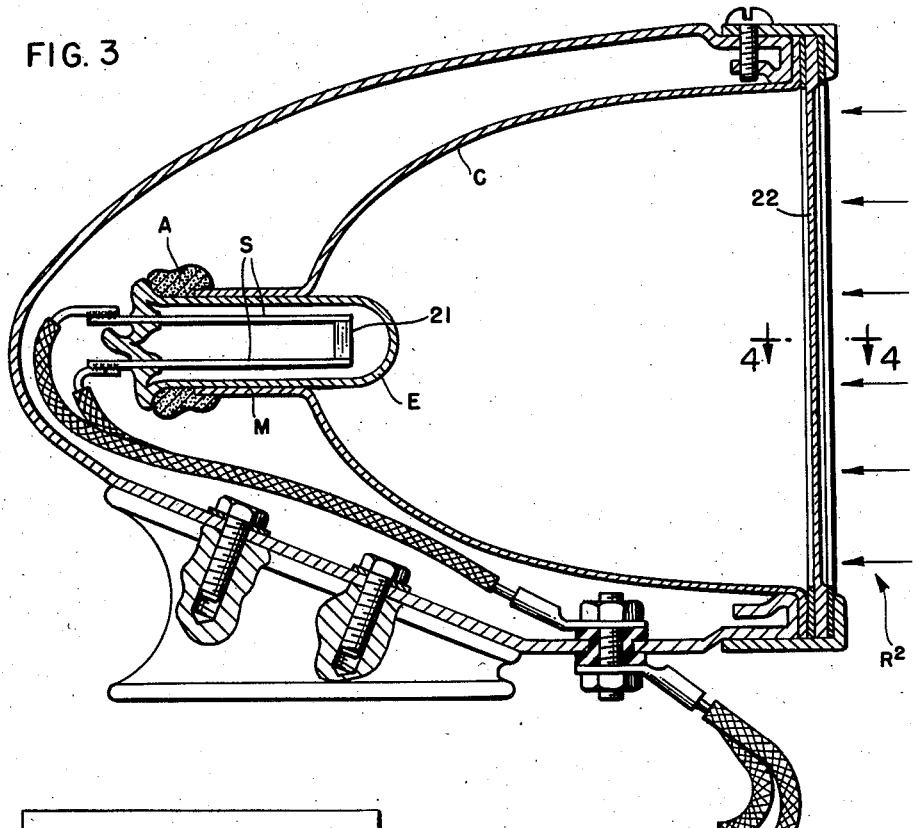
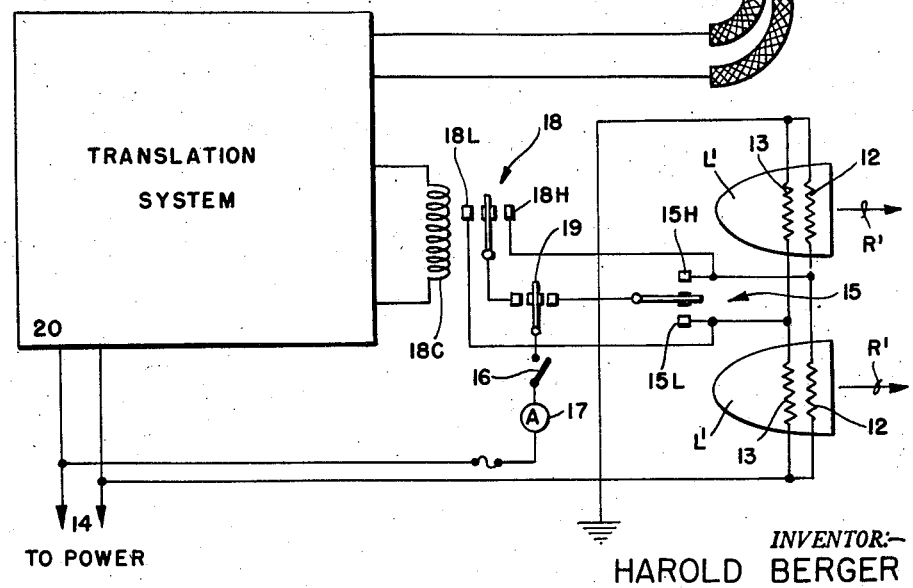
TO POWER
INVENTOR:—
HAROLD BERGER
BY:—
Junius F. Cook, Jr.
ATTORNEY

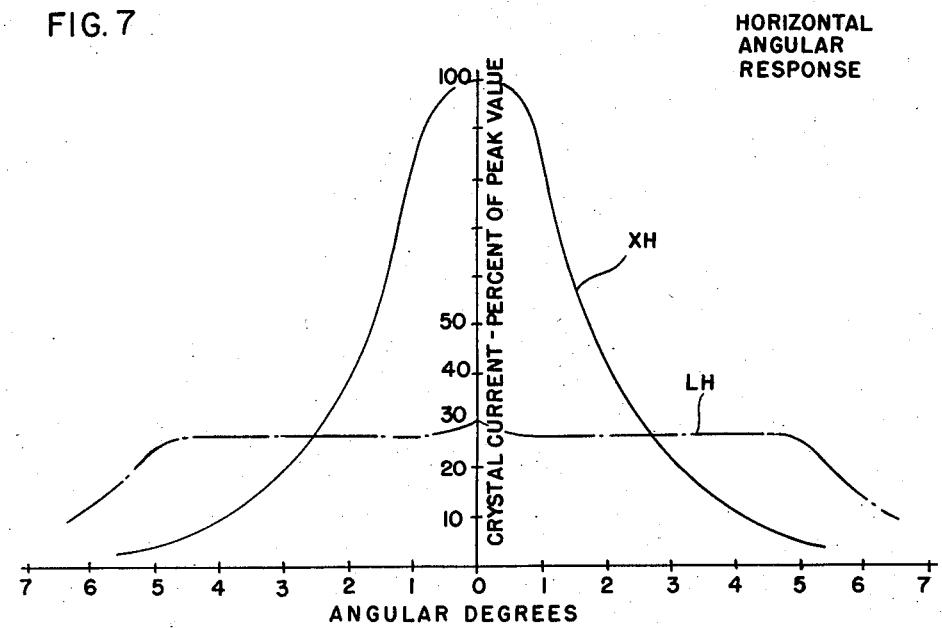
FIG. 7 — HORIZONTAL ANGULAR RESPONSE
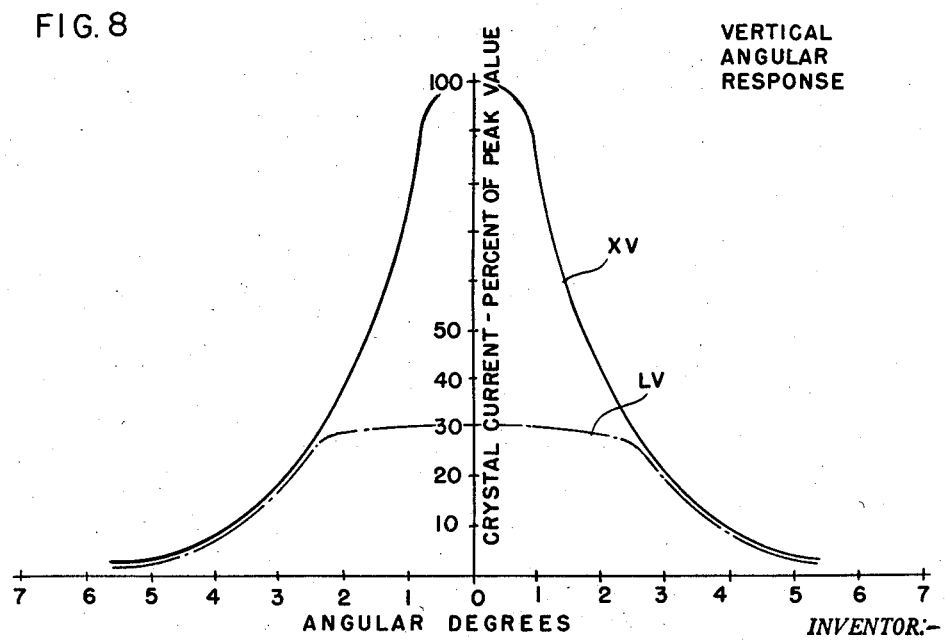
FIG. 8 — VERTICAL ANGULAR RESPONSE
INVENTOR:—
HAROLD BERGER
ATTORNEY United States Patent Office 2,855,523
Patented Oct. 7, 1958

2,855,523

LIGHT RESPONSIVE SYSTEM

Harold Berger, Waukesha, Wis., assignor to General Electric Company, a corporation of New York Application January 21, 1954, Serial No. 405,473

3 Claims. (Cl. 250—216)

The present invention relates in general to illumination, and has more particular reference to the control of light emitting lamps, especially vehicle headlights, the invention pertaining specifically to an improved system operable automatically to dim the headlights of a vehicle in response to the head-on approach of another headlighted vehicle.

Vehicle headlights commonly comprise electrical lamps and associated means selectively operable to project so-called "bright" and "dim" light beams. To this end, the vehicle headlights may comprise lamps each containing dual filaments in combination with reflector means, the filaments being positioned with respect to the associated reflector means so as to project the "bright" or "high" light beam substantially horizontally, when one of the filaments is energized, a downwardly inclined "dim" or "low" beam being emitted when the other of said filaments is energized.

The high beam may be employed for normal night driving purposes, it being the courteous practice to dim the vehicle headlights by causing the same to emit only a dim or low beam when approaching another vehicle, traveling in the opposite direction, at night, in order to eliminate driving hazards due to the eye dazzling effect of a high beam upon the operator of the approaching vehicle.

For headlight dimming purposes it is conventional to provide a dimming switch operable, as by foot pressure of the vehicle operator, to cause the lamps alternately to project bright and dim light beams. The provision of automatically operating control means has also been proposed for dimming the headlights of a vehicle in response to the approach of another headlighted vehicle proceeding in the opposite direction and for restoring the vehicle headlights to bright beam emitting condition immediately after the passage of the approaching vehicle, such control means comprising an electrical translation circuit for dimming and restoring to bright beam condition the headlights of the vehicle under the control of a light sensitive detector element mounted upon the vehicle in position to receive the impingement of light rays emitted by the headlights of the approaching vehicle, whereby the automatic headlight controlling means may be actuated in accordance with the intensity at which light beams emitted by the headlamps of the approaching vehicle impinge upon the light sensitive detector.

A light sensitive detector of the character mentioned, of course, will respond to all light rays impinging thereon whether the same be emitted by the headlamps of an approaching vehicle, by street lamps, or by other roadside sources of illumination. It is desirable, however, for automatic vehicle headlight control purposes, to provide means whereby the lamp controlling translation system, under the control of its associated light sensitive detector, will respond effectively, so far as possible, only in response to variation of intensity of detector impinging light rays emitted only by the headlights of approaching vehicles, since operation of the lamp control system in response to light rays emitted from sources other than the lamps of an approaching vehicle is obviously undesirable.

An important object of the present invention is to provide effective means assuring operation of automatic vehicle headlight controlling means only in response to the approach of another headlighted vehicle proceeding in the opposite direction; a further object being to provide means for screening from a light sensitive detector substantially all light rays save those which approach the detector from a predetermined direction.

Another important object resides in providing means for excluding from impingement upon a light sensitive detector element all light rays except those approaching the detector in directions lying within a zone of relatively small angularity extending radially of the detector; a further object being to screen from the detector element all rays other than those approaching the detector in a horizontal zone extending radially of the detector element and having angularity of the order of less than 10°; a still further object being to screen from the detector element all rays other than those approaching the detector in a vertical zone extending radially of the detector element and having angularity of the order of less than 10°.

Another important object is to provide a light sensitive detector for a vehicle headlight control system, including means for rendering the detector substantially non-responsive to all light rays except those that approach the detector from forwardly of the vehicle in which mounted on paths converging toward the detector at angles of less than 10° horizontally and 5° vertically, whereby the detector is responsive substantially only to rays applied thereto from the headlamps of approaching vehicles.

Another important object is to provide for screening a light sensitive detector of the sort mentioned by disposing it substantially at the focus of a parabolic reflector, whereby only rays approaching the detector along paths coincident to and substantially parallel with the axis of the reflector, within the area of the reflector, may all be caused to impinge upon the detector.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings:

Figs. 1 and 2 are diagrammatic showings illustrating the head-on approach of headlighted vehicles;

Fig. 3 is a diagrammatic representation of the elements of a vehicle mounted, light responsive headlight control system embodying the present invention, including a sectionally illustrated light responsive element and associated light collecting means;

Fig. 4 is an enlarged sectional view taken substantially along the line 4—4 in Fig. 3;

Figs. 5 and 6 are diagrammatic views, respectively illustrating the vertical and horizontal light collecting action of the collecting means shown in Fig. 3; and Figs. 7 and 8 comprise graphic illustrations of the light spreading effect, respectively horizontally and vertically, of a lens element forming a component part of the light spreading means.

To illustrate the invention, the drawings show a vehicle V' carrying a pair of vehicle headlamps L' for projecting beams of light R' outwardly of the vehicle in which the lamps are mounted. Each of the lamps L' may embody a high or bright beam filament 12 and a low or dim beam filament 13, one end of each of said filaments being electrically connected to the preferably grounded side of a suitable electrical power source 14. The ground remote ends of the high beam filaments may be electrically interconnected with one contact 15H of a single pole, double throw, manually operable dimmer switch 15. The ground remote ends of the low beam filaments may also be interconnected with another contract 15L of said dimmer switch, the pole of the dimmer switch being electrically connectible with the ground remote side of the power source 14, as through suitable circuit making devices, which may include a disconnecting switch 16 and other circuit devices, such as a meter 17 and a fuse, if desired.

The power source 14 may conveniently comprise a conventional storage battery of the sort commonly provided as standard equipment in automatic vehicles for the operation of headlights and other electrical equipment. When the pole of the switch 15 is connected with the power source 14, it will be seen that the bright and dim beam filaments 12 and 13 may be alternately energized by operation of the dimmer switch 15, which may conveniently be mounted upon the floor of the vehicle V' in position to be actuated by the foot of the operator of the vehicle. The light rays R' emitted by the vehicle headlamps L' may thus be dimmed by the voluntary action of the vehicle operator, in response to the head-on approach of another headlighted vehicle V², and the rays R' may, of course, be restored at will to bright condition by the operator of the vehicle V', as after the passage of the vehicle V² behind the vehicle V'.

In order to provide for the automatic control of the headlights L' in response to the head-on approach of another headlighted vehicle, such as the vehicle V², a single pole, double throw, automatically operable relay switch 18, having a pair of stationary contacts 18L and 18H, may be employed, said relay switch having an operating coil 18C and a pole normally biased, as by means of a spring, to yieldingly engage with the contact 18H. The contacts 18H and 18L may be electrically connected, respectively with the ground remote sides of the bright and dim lamp filaments 12 and 13, and selector means, such as the single pole, double throw switch 19, may be provided for electrically connecting the poles of the switches 15 and 18 selectively with the power source 14.

The manually operable dimmer switch 15 may, of course, be omitted entirely, in which case the selector switch 19 may also be omitted and the pole of the relay switch 18 connected directly with the switch 16; but where both manually operable and automatically operable switches 15 and 18 are included in the same system, it may be desirable to provide the selector switch 19 or other suitable means, operable so that headlight energizing power may be supplied from the source 14 either through the manually operable switch 15 or through the automatically operated relay switch 18.

Since the switch 18 is normally biased to engage its blade with the switch contact 18H, the high beam filaments of the lamps L' will be normally energized for operation. The blade of the relay switch 18, however, is movable in response to excitation of the coil 18C in order to disengage the contact 18H and to engage the blade with the contact 18L, thereby disabling the high beam filaments 12 and energizing the low beam filaments 13 for operation.

In order to provide for the automatic control of the lamps L', in response to the head-on approach of another headlighted vehicle, such as the vehicle V², the present invention contemplates the provision of a light responsive, electrically actuated translation system 20 which may be energized from the power source 14, the translation system 20 being operable to energize the relay coil 18C in response to the head-on approach of said other headlighted vehicle V², when the intensity of the headlight beams R², which reach the vehicle V' from the headlamps L² of the approaching vehicle V², attains a selected lamp dimming level. The translation system 20 may comprise any suitable, preferred or convenient arrangement of apparatus, such, for example, as is shown in the copending application for United States Letters Patent Serial No. 385,563, filed October 12, 1953, on the invention of John E. Jacobs for Light Responsive System. The system 20 is operable to energize the relay coil 18C under the control of a light sensitive detector 21 disposed in the vehicle V' in position to receive the impingement of the light rays R² emitted by the headlights of an approaching vehicle.

While any suitable or convenient light responsive detector means may be employed, the present invention contemplates the use, as a light detector 21, of a semiconductor material of the electron donor type, particularly crystalline material selected from the class comprising cadmium sulphide, mercury sulphide, and cadmium selenide. These crystalline semi-conductors, especially cadmium sulphide, exhibit the power of altering the electrical impedance of their constituent material as a function of the intensity of light rays impinging thereon. The detector 21, accordingly, may be made to control the system 20 in order to energize the coil 18C when the impedance of the detector reaches a predetermined value in response to the progressively increasing light intensity applied to the detector by the headlight beams R² of an approaching vehicle.

The light sensitive crystal detector 21 may be sealed within a translucent, preferably glass envelope E forming a tubular member, the detector element 21 being electrically connected on and between the ends of a pair of spaced apart, electrical conducting support stems S extending through and outwardly of said tubular envelope member for connection with the translation system, as by means of suitable conductors. The detector enclosing envelope may be mounted in position presenting the detector crystal 21 at the focus of a light collecting reflector device C, which may conveniently comprise a parabolic shell formed with internal, light reflecting surfaces adapted to deliver, at the focus of the collector device, all light rays entering the open end of the shell in a direction substantially parallel with respect to the longitudinal axis of the parabolic reflector shell. The shell, at its apexial portion, opposite the open end thereof, may be fitted with a mounting sleeve M sized to snugly yet slidingly receive the cylindrical portions of the detector enclosing envelope; and said envelope may be secured and anchored in the sleeve M, in position presenting the crystal 21 at the focus of the light collecting device C, as by taping or cementing the same in place in the sleeve, as by means of adhesive tape or preferably quick drying cement such as malachite basic cement A.

In order to obtain operation of the system 20 only in response to light rays emitted by the headlamps L² of an approaching vehicle, it is necessary to screen from the detector element 21 all light rays except those which approach the detector from forwardly of the vehicle in which the detector is mounted, along paths lying within angles of the order of ±2.5° of a horizontal plane taken through the axis of the detector, and also along paths lying within angles of the order of ±5° of the vertical plane. If light rays approaching the detector from a source disposed appreciably more than 2.5° above or below a substantial horizontal plane through the detector are not excluded, the system may be undesirably responsive not only to light emitted from overhead street illuminating lamps, but also to the road reflected glare of light emitted by the headlamps of the vehicle in which the detector is mounted. It is desirable, however, to actuate the system 20 in response to the approach around a road curve of another headlighted vehicle. Accordingly, the detector 21 should be sensitively responsive to light rays emanating from sources disposed on either side of the vertical plane, which extends through the detector and longitudinally of the vehicle in which the detector is mounted, in position making angles of at least 5° with said vertical plane at the detector.

A parabolic reflector of the sort shown at C will normally accept and apply, at the focus of the reflector, only such light rays as enter the open end of the reflector substantially along the axis thereof and on paths substantially parallel with respect to such axis. The detector element 21, however, which is disposed at the focus of the reflector, may define a light sensitive zone having a diameter of the order of 1/16 inch. The light collecting reflector C, accordingly, may be configurated, in conjunction with the light sensitive area of the detector element 21, so as to apply to the detector element substantially all light rays which enter the open end of the reflector along the longitudinal axis thereof and at angles not exceeding 2° with respect to said axis. To provide for the foregoing result, a parabolic reflector having a diameter of the order of 1.75 inches at its open end, depth of the order of 1.875 inches, and a focal length of the order of 1/8 inch, may be employed, as illustrated more particularly in Fig. 5 of the drawings.

In order to modify the horizontal light receiving action of the reflecting collector C, a lens element 22 may be mounted in position covering the open end of the reflector C, said lens preferably comprising a pane of glass, or other suitable lens forming material, having a flat surface 23 on one side of the element and a fluted surface comprising parallel, spaced apart ribs 24 and arcuately curved, elongated depressions 25 extending between the ribs 24. The lens 22 is secured across the open end of the reflecting collector C with the flat and fluted surfaces of the lens element respectively facing inwardly and outwardly of the light-collector C. The lens element 22 refracts light rays impinging upon the fluted surface thereof in fashion such that rays, applied to the fluted surface at angles of the order of 5° on either side of a reference plane extending at right angles with respect to the lens element and parallel with respect to the flutes 24, will be transmitted through the element and emitted at the flat side thereof at angles of the order of 2.5° with respect to said plane. Such transmitted rays, emitted from the lens and into the collector C, will be applied upon the detector element 21.

The lens thus performs a ray gathering function, to the end that light rays, applied to the lens from sources spaced on either side of a plane extending through the detector and axially of the light collector in position making an angle of the order of 5° or less with said plane at the detector, will be collected by the lens element and applied by the reflector C upon the detector.

The lens element 22, as shown in Figs. 7 and 8, performs an additional useful function in conjunction with the reflector C. As shown in Figs. 7 and 8, the curves XH and XV illustrate the response of the detector 21 to beams of light applied to the collecting reflector at various angularities on opposite sides of vertical and horizontal planes extending through the detector 21 and the longitudinal axis of the collector C. The curves LH and LV respectively illustrate the detector response horizontally and vertically to the application of beams of light applied to the collecting reflector through the lens 22 at various angularities on opposite sides of vertical and horizontal planes extending through the detector 21 and the longitudinal axis of the collector C.

The graphs 7 and 8 illustrate the horizontal light collecting effect of the lens element 22, whereby the response curve LH indicates an effective response level for all angles up to 5° on either side of a vertical plane through the detector and longitudinally of the collector, while the curve LV indicates an effective response level for all angles up to 2.5° above and below a horizontal plane through the detector and longitudinally of the collector. The graphs furthermore indicate the desirable function of the lens element 22 in rendering the response of the detector substantially uniform between the ±5° horizontal limits and the ±2.5° vertical limits, as compared with the relatively non-uniform or peaked response characteristic illustrated by the curves XH and XV. It is, of course, highly desirable in the interests of response accuracy to maintain substantial uniformity of response throughout the effective response range.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. Light responsive detector means for use in controlling vehicle lamps and comprising a photosensitive detector element, a light collecting reflector for applying on said element only such rays of light as emanate from light sources disposed within a limited field extending radially of said element, and a lens mounted on said reflector in position to screen light rays entering the reflector and to direct rays upon said element, said lens being formed with spaced parallel and sharply ridged ray converging flutes and intervening grooves extending across the lens and adapted to converge light rays in the direction of planes normal to said flutes without materially affecting the path of rays traveling in planes parallel with said flutes, whereby to direct, upon the detector element, rays of light emanating from sources lying within zones disposed outwardly and on opposite sides of said limited field.

2. Light responsive detector means for use in controlling vehicle lamps and comprising a photosensitive detector element, a light collecting reflector for applying on said element only such rays of light as emanate from light sources disposed within a limited field extending radially of said element and subtending an angle of the order of five degrees, at said element, means to mount the reflector and the detector element upon a vehicle, and a lens mounted on said reflector in position to screen light rays entering the reflector and to direct rays upon said element, said lens being formed with spaced parallel ray converging lens portions extending vertically across the lens, whereby to direct, upon the detector element, rays of light emanating from sources lying within lateral zones disposed outwardly and on opposite sides of said field and subtending, in the aggregate, an angle of the order of ten degrees, at said element.

3. Light responsive detector means for use in controlling vehicle lamps and comprising a photosensitive detector element, and means including a light collecting reflector for applying on said element only such rays of light as emanate from light sources disposed within a limited field extending radially of said element, and an associated lens mounted on said reflector and formed with parallel flutes for converging, upon said detector, light rays emanating from sources outwardly of said limited field and on opposite sides thereof in lateral directions substantially normal to said flutes.

References Cited in the file of this patent

UNITED STATES PATENTS

| | | |
|---|---|---|
| 1,178,882 | Slocum | Apr. 11, 1916 |
| 1,560,793 | Dunlea | Nov. 10, 1925 |
| 1,626,406 | Godley | Apr. 26, 1927 |
| 2,182,987 | Hopkins | Dec. 12, 1939 |
| 2,551,954 | Lehman | May 8, 1951 |
| 2,612,817 | Willcox | Oct. 7, 1952 |
| 2,674,700 | Small | Apr. 6, 1954 |
| 2,762,930 | Onksen | Sept. 11, 1956 |

FOREIGN PATENTS

| | | |
|---|---|---|
| 143,232 | Austria | Oct. 25, 1935 |
| 663,504 | Great Britain | Dec. 19, 1951 |